Jan. 3, 1950 R. W. BALTOSSER 2,493,519

REPRODUCING AND TRANSLATING APPARATUS

Filed Dec. 29, 1948 5 Sheets-Sheet 1

INVENTOR.

BY Robert W. Baltosser,

Mason, Kolehmainen, Rathburn and Wyss

Attys.

INVENTOR.
Robert W. Baltosser,
BY
Mason, Kolehmainen, Rathburn and Wyss
Atty's.

Jan. 3, 1950 R. W. BALTOSSER 2,493,519

REPRODUCING AND TRANSLATING APPARATUS

Filed Dec. 29, 1948 5 Sheets-Sheet 3

INVENTOR.
Robert W. Baltosser,
BY
Mason, Kolehmainen, Rathburn and Wyss
Atty's.

INVENTOR.
Robert W. Baltosser,
BY
Mason, Kolehmainen, Rathburn & Wyss
Attys.

REPRODUCING AND TRANSLATING APPARATUS

Filed Dec. 29, 1948 5 Sheets-Sheet 5

INVENTOR.
Robert W. Baltosser,
BY
Mason, Kolehmainen, Rathburn and Wyss
Atty's.

Patented Jan. 3, 1950

2,493,519

UNITED STATES PATENT OFFICE 2,493,519

REPRODUCING AND TRANSLATING APPARATUS

Robert W. Baltosser, Tulsa, Okla., assignor to Seismograph Service Corporation, Tulsa, Okla., a corporation of Delaware Application December 29, 1948, Serial No. 67,932

11 Claims. (Cl. 250—206)

This invention relates to reproducing and translating apparatus, more particularly to apparatus for translating variable amplitude or variable density film records into corresponding electrical signals and the invention has for an object the provision of reproducing apparatus of this character which is of compact and rugged construction, is readily controllable and is highly flexible in its operation.

In a co-pending application Serial No. 721,559 filed January 11, 1947, now Patent No. 2,463,534, in the name of James E. Hawkins, for Method and apparatus for analyzing seismographic records, which application is assigned to the same assignee as the present invention, there is described and broadly claimed reproducing and translating apparatus for analyzing wave records, wherein a hollow rotatable drum formed of light transmitting material and means for supporting a wave record on the drum in readily releasable fashion for rotation with the drum are provided, together with a fixed source of light outside of the drum for transmitting a beam of light through the wave record and drum onto a detachably supported photoelectric cell assembly including a plurality of photoelectric cells for converting the beam of light as caused to vary by the variable area information contained on the record into variable electric signals. In the apparatus disclosed in the said Hawkins application variable speed motor means are provided for rotating the hollow transparent drum and the output circuits of the photoelectric cells contained in the photoelectric cell assembly are connected to suitable signal amplifying means.

The reproducing apparatus disclosed in the said Hawkins application, although particularly applicable to the analysis of seismographic records, is not limited thereto but may be employed generally in the analysis, reproduction and utilization of various other types of records. To this end it is desirable to provide for a high degree of flexibility, adjustability and accurate control of the apparatus, and accordingly it is a further object of this invention to provide reproducing and translating apparatus of the above indicated character which is capable of general application to various uses.

It is a further object of the invention to provide a self-contained apparatus of the above character which is of rugged construction and readily portable.

Still another object of the present invention is to provide reproducing apparatus for simultaneously translating into electric signals a plurality of record traces on a single film wherein means are provided for independent adjustment, monitoring and control of the various signal output circuits.

Another object of the invention is to provide a compactly constructed apparatus wherein the various parts thereof are readily accessible for adjustment, inspection and repair.

In carrying out the invention in one form a reproducing and translating apparatus of the type disclosed in the said Hawkins application is provided with means for individually and selectively monitoring the output circuits from each of the photoelectric cells and the input circuit to the source of light, together with means for adjusting the signal level of each output circuit in predetermined steps, and the entire apparatus is arranged in compact relation within a cabinet providing for ready inspection, repair and replacement of the various component parts.

The invention, both as to its organization and method of operation, will best be understood by reference to the following specification taken in connection with the accompanying drawings, in which.

Figure 9:
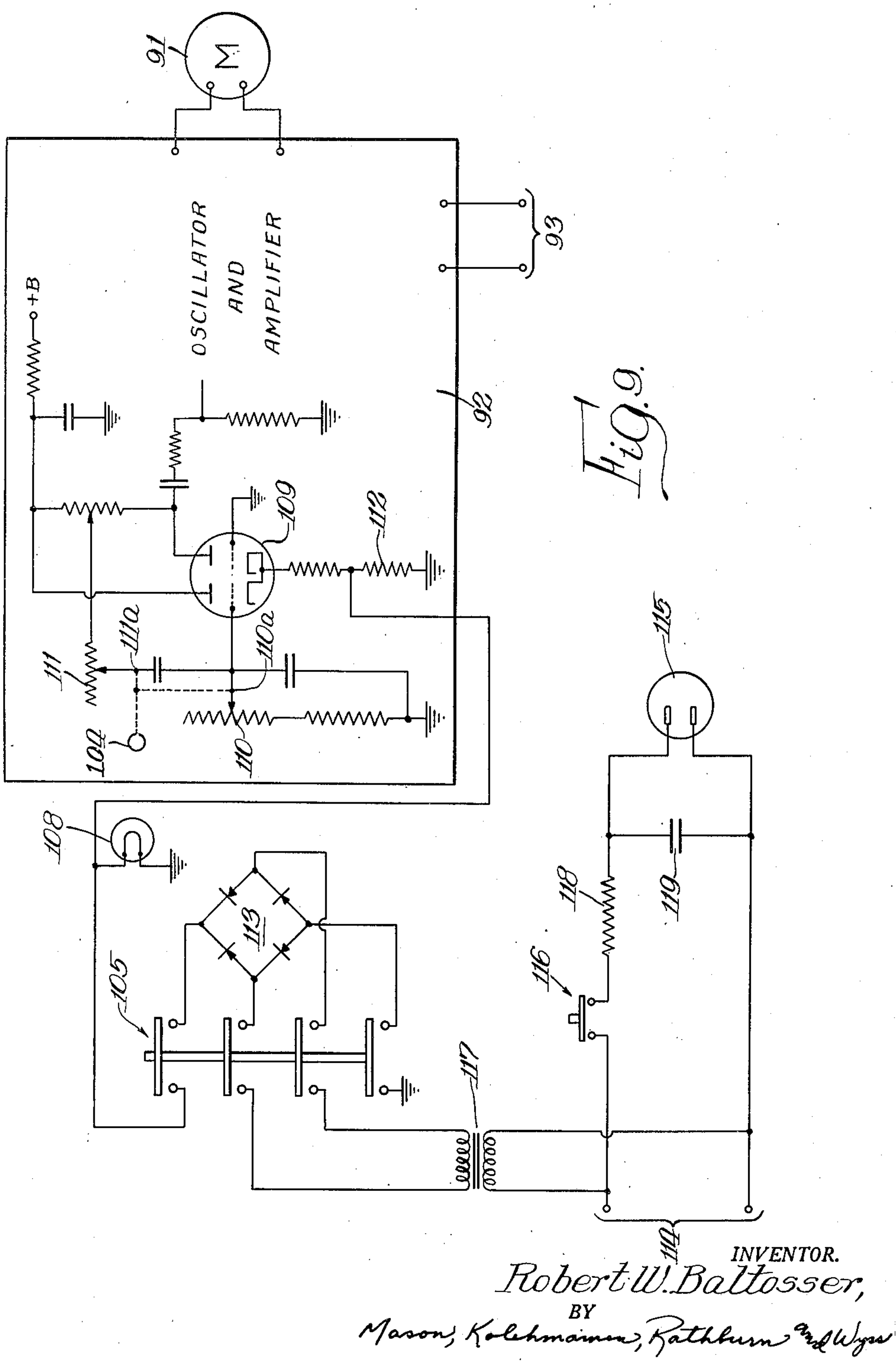

Fig. 9 diagrammatically illustrates the circuit arrangement provided to control the film driving motor and the energizing circuit for the stroboscopic synchronizing lamp embodied in the apparatus.

Referring now to the drawings, the invention is shown as embodied in reproducing and translating apparatus comprising a cabinet 10 having fixed end walls 11 and 12, and a fixed rear wall 13, to which is rigidly connected by a hinge 14 a movable top wall 15. As shown, the front wall of the cabinet comprises an angularly disposed fixed portion 16 and a removable vertically disposed portion 17, which is normally secured to the end walls 11 and 12 by screws 18. The front wall portions 16 and 17 cooperate to form a control panel on which are mounted various control knobs and indicating means, as will be more fully described hereinafter. The cabinet 10 also includes a bottom wall 19 which is disposed substantially in the plane of the upper edge of the sloping front wall portion 16.

Figure 3:
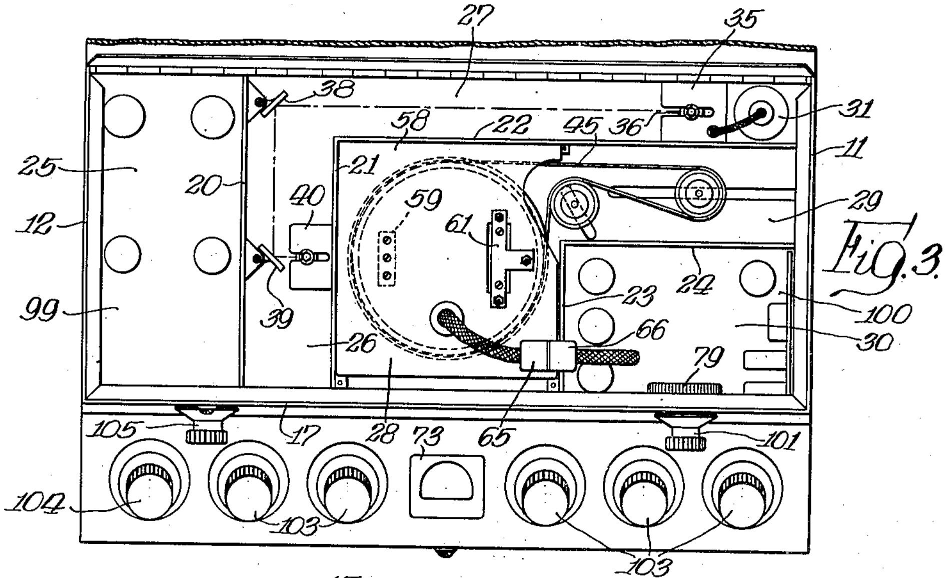
Fig. 3 is a top plan view with the top of the cabinet open and partially broken away, illustrating the arrangement of various portions of the apparatus within the cabinet.
Figure 4:
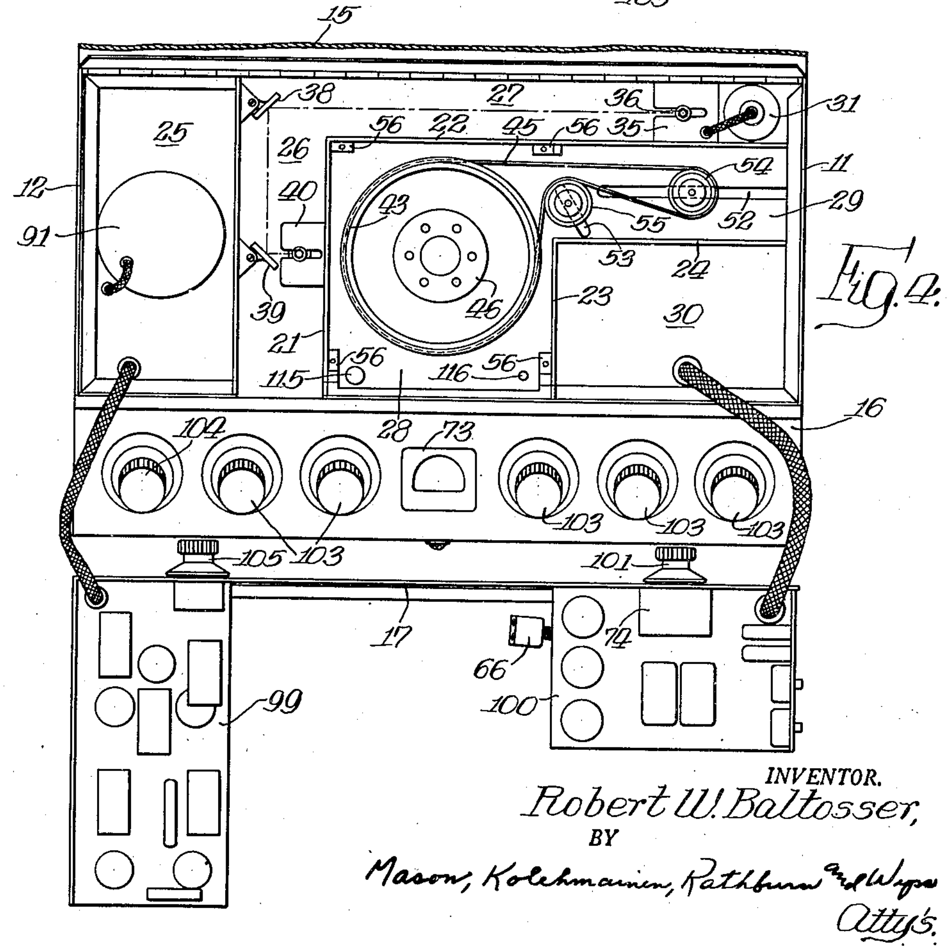
Fig. 4 is a view similar to Fig. 3 but with a portion of the front wall and the various components carried thereby removed from the normal position shown in Fig. 3.

As best shown in Figs. 3 and 4, the cabinet 10 is provided with a plurality of intermediate partitions 20, 21, 22, 23 and 24, which are arranged to divide the interior of the cabinet into a first compartment 25, an L-shaped light path comprising the legs 26 and 27, and L-shaped drum and record receiving chamber comprising the legs 28 and 29, and a second compartment 30. Disposed in one end of the leg 27 of the L-shaped light path is a fixed source of light which, as shown best in Fig. 6 may comprise a suitable electric light bulb 31 mounted within a chamber 32, having a front wall 33, in which a suitable aperture or gate 34 is provided through which the light may pass into the leg 27 of the light path. Mounted on suitable supports 35, extending from the wall 33, is a condensing lens structure 36 which, as shown best in Fig. 5, includes a cylindrical lens 37 of plano-convex cross-section. From the lens 37 the light passes along the leg 27 of the L-shaped light path and impinges upon a reflecting mirror 38 disposed at the intersection of the legs 27 and 26. From the mirror 38 the light is directed to a second mirror 39 mounted in the leg 26 on the partition 20, which mirror is effective to direct the light beam into a lens structure 40 mounted on the partition 21. This lens structure 40, as indicated in Figs. 5 and 6, consists of an elongated plano-convex cylindrical lens 41, which serves to direct a plurality of beams of light through a suitable gate or aperture 42 in the partition 21 so that the light beams pass into the leg 28 of the L-shaped drum and record receiving chamber.

Figures 5, 6:
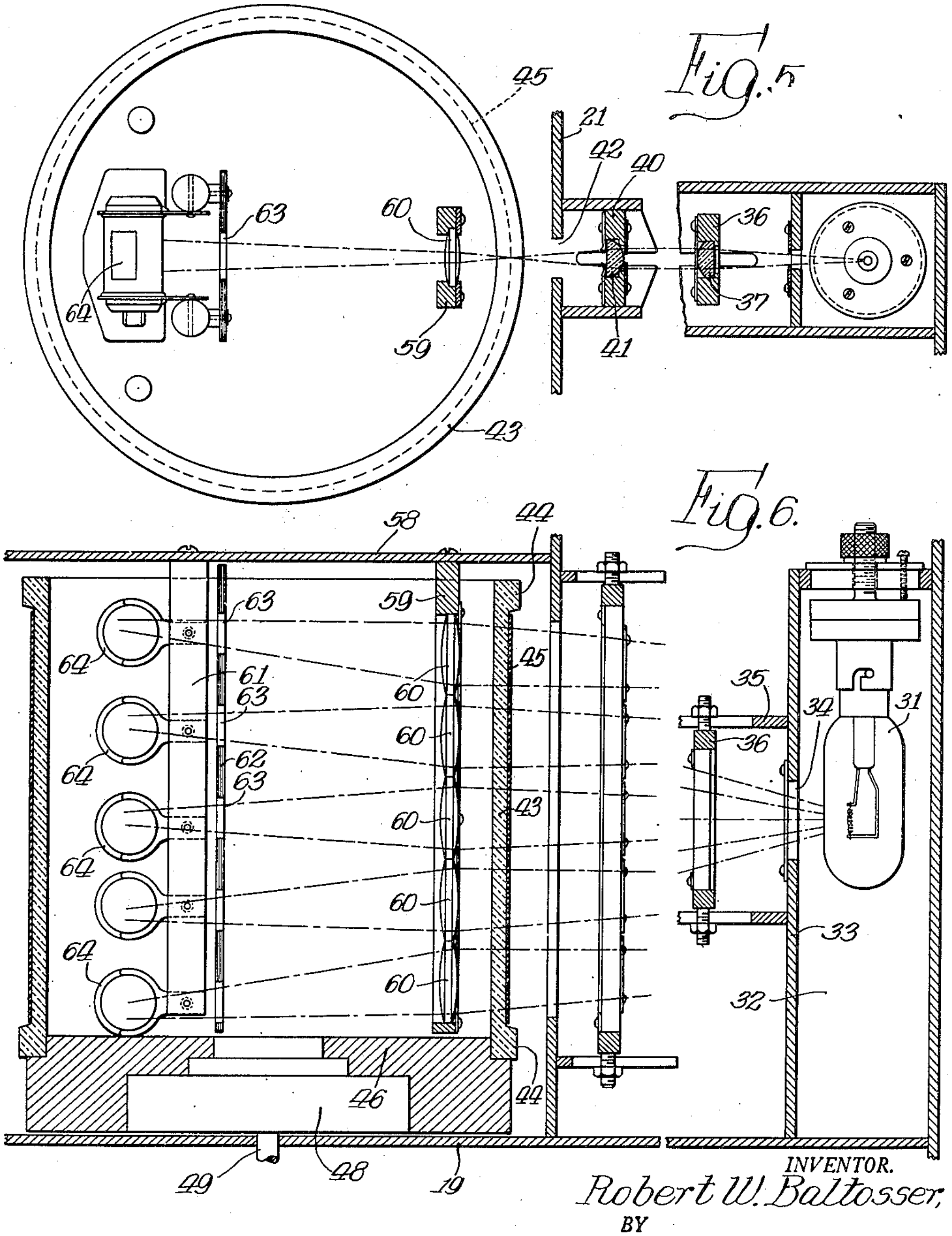
Fig. 5 is a somewhat diagrammatic fragmentary top plan view, showing the fixed light source, a portion of the light path and the rotatable drum and photoelectric cell assembly embodied in the apparatus of Figs. 1 to 4.
Fig. 6 is a view similar to Fig. 5 but showing the parts in elevation and partially in section.
Figure 7:
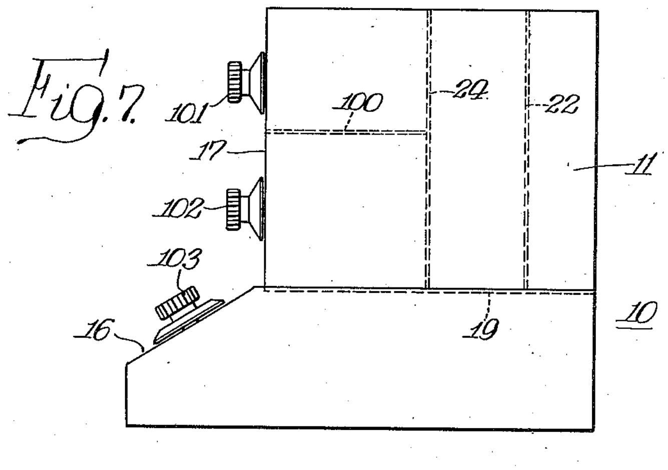
Fig. 7 is an end elevational view of the apparatus shown in Figs. 1 to 4 inclusive.

Mounted within the leg 28 of the L-shaped chamber opposite the aperture 42 is a hollow transparent drum 43, which is preferably formed of glass or transparent plastic material, and which, as shown best in Fig. 6, is provided at its upper and lower edges with suitable guide shoulders 44 for engaging the edges of a film or record strip 45 which surrounds the transparent drum. Although the drum 43 may be mounted for rotation in any suitable fashion, it is shown somewhat diagrammatically in Fig. 6 as being secured to a base member 46, which is in turn secured to a rotating head 47 mounted on a shaft 49 which extends through the bottom wall 19 of the cabinet. The lower end of the shaft 49 is supported beneath the bottom wall of the cabinet, as shown in Fig. 2, in a supporting plate 50, and the shaft is provided with a suitable drive pulley 51.

Figure 2:
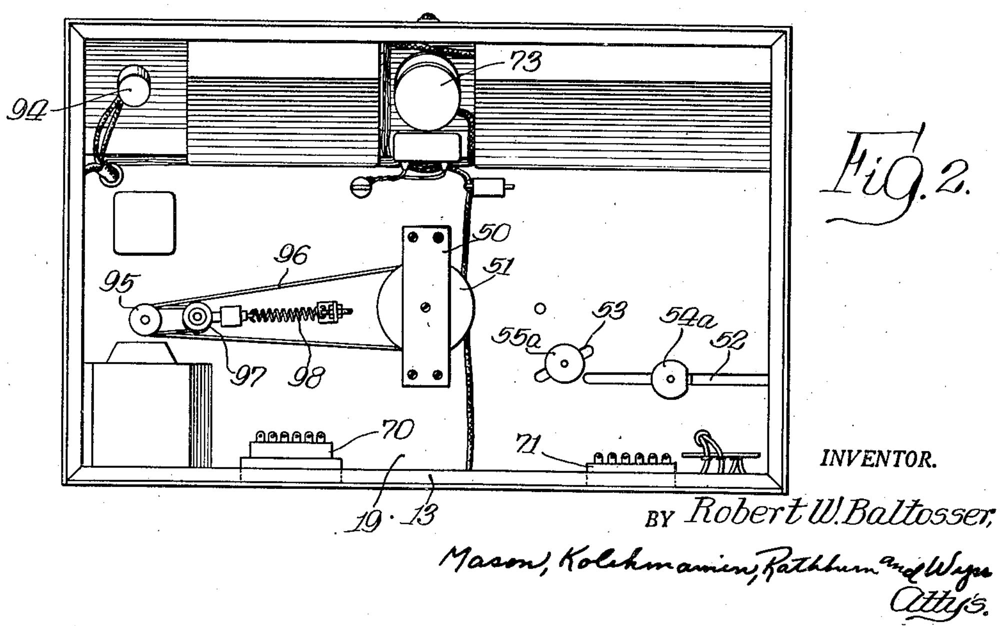
Fig. 2 is a bottom plan view of the apparatus shown in Fig. 1.

As shown best in Figs. 2, 3 and 4, the leg of the L-shaped drum and record chamber is provided in its bottom wall with a plurality of slots 52 and 53, in which are adjustably mounted a pair of rollers 54 and 55 for receiving the film or record 45 which is in the form of an endless belt, the rollers 54 and 55 by reason of their adjustability providing for the mounting of endless record strips of varying lengths on the transparent drum 43. Suitable thumb screws 54*a* and 55*a* are provided for positioning the rollers 54 and 55 in the slots 52 and 53.

Disposed in the four corners of the leg 28 of the drum receiving chamber are suitable guide members 56 (Fig. 4) for receiving a plurality of supporting pins 57 (Fig. 1), which carry a supporting panel 58 from which is suspended a lens assembly 59 comprising a plurality of lenses 60. This panel 58 also supports a photoelectric cell assembly 61, which comprises a suitable light guard 62 having a plurality of gates 63 therein, behind which are mounted a plurality of photoelectric cells 64.

Figure 1:
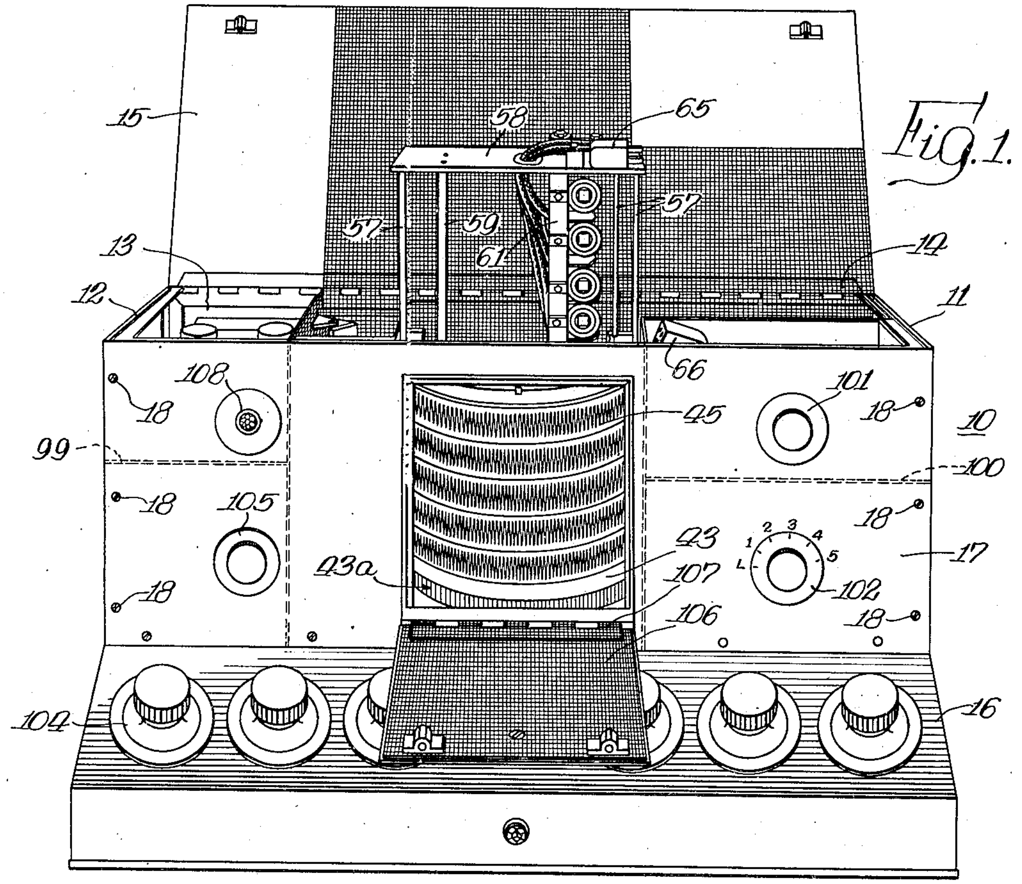
Fig. 1 is a front view of reproducing and translating apparatus embodying the present invention, with certain of the removable panels of the enclosing cabinet open and with the photoelectric cell assembly in partially disassembled relation.

The lens 41 in the lens assembly 40 not only directs the beams of light through the gate or aperture 42 into the leg 28 of the drum and record chamber, but also serves to focus the light on the film or record strip 45, as indicated diagrammatically in Fig. 5. After passing through the film, the various beams of light which vary in intensity in accordance with the records contained on the film 45 pass through the lenses 60 and the gates 63 to the photoelectric cells 64. In Fig. 1 the film or record strip 45 is shown as bearing five separate records and in Figure 6 the photoelectric cell assembly is shown as including five photoelectric cells 64. It will, of course, be obvious that more or less photoelectric cells and separate records on film 45 may be employed as desired. By virtue of the arrangement thus far described, it may be seen that the apparatus is compactly arranged to provide a closed light path of substantially L shape extending from the fixed source of light to the photoelectric cells within the drum 43 and moreover as shown best in Fig. 1, the various components of the optical system may be readily inspected merely by lifting the top wall 15 of the cabinet, and the panel 58 carrying the lens assembly 59 and the photoelectric cell assembly 61 may be readily removed. The electrical connections constituting the output circuits of the photoelectric cells include a multiple circuit plug connector comprising the separable plug members 65 and 66.

Turning now to the circuit diagram of Fig. 8, it will be seen that the output circuits of the photoelectric cells 64 are individually connected to suitable amplifiers 67, the output circuits of which extend through individually adjustable potentiometers 68 to suitable attenuators 69, the output circuits of which are connected to a multiple plug output terminal board 70, which, as shown in Fig. 2, is preferably mounted on the rear wall 13 of the cabinet below the bottom wall 19, a similar input terminal board 71 also being mounted on the rear wall and beneath the bottom wall.

In order to provide for selective monitoring of the amplifier output circuits so as to permit adjustment of the potentiometers 68, thereby to provide the desired signal level, a vacuum tube voltmeter is provided which may be of conventional construction and which is indicated diagrammatically by the rectangle 72, the output circuit of the vacuum tube voltmeter being connected to a suitable indicating meter 73. Associated with the vacuum tube voltmeter and the indicating meter is a multi-position selective switch 74 having three sets of contacts 75, 76 and 77. The multiple position switch 74, as shown, is provided in each set with six contacts, the last five of which are connected in circuit with the various amplifier output circuits and the vacuum tube voltmeter 72 so as to permit individual monitoring of each circuit. The first contact in each set, as shown in Fig. 8, is employed when it is desired to monitor the energizing circuit for the source of light 31.

Figure 8:
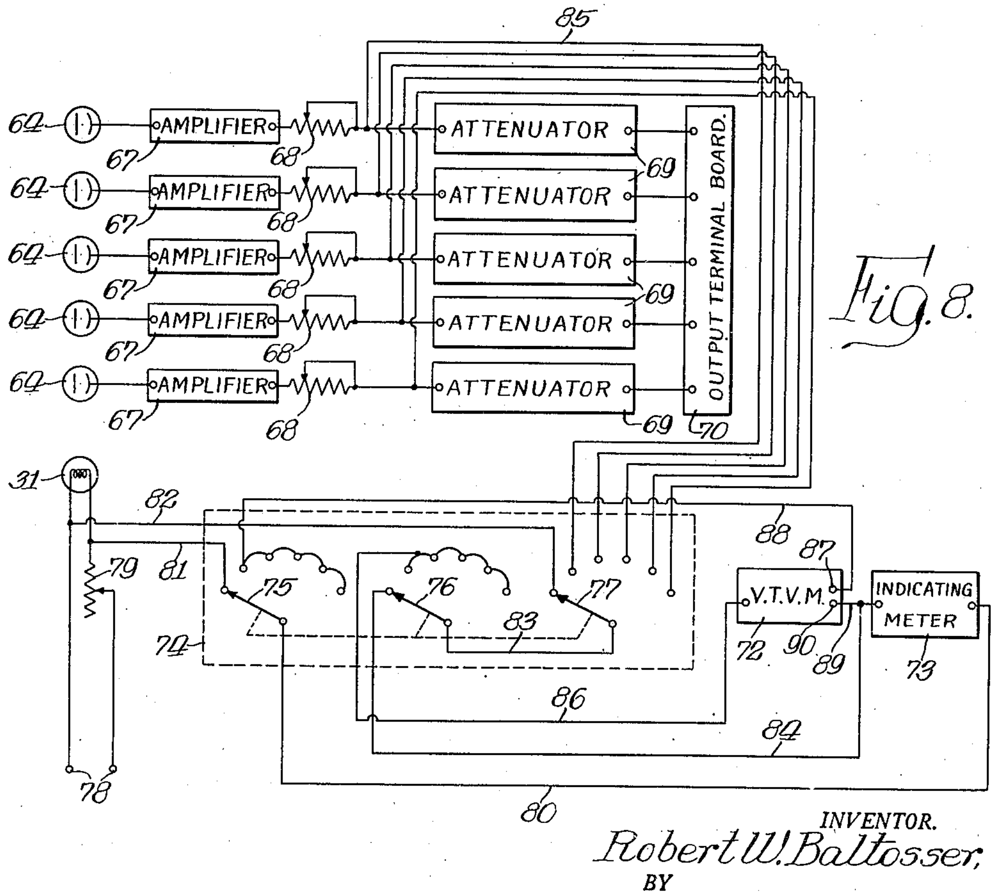
Fig. 8 is a diagrammatic representation of some of the circuits and component parts embodied in the apparatus of Figs. 1 to 7, inclusive.

As indicated diagrammatically, the light source 31 is connected to a suitable source of energy represented by the terminals 78 through an adjustable rheostat 79, so that the light level may be raised or lowered as desired, and it will be observed that when the multi-position switch 74 is in the first position shown in Fig. 8, the indicating meter 73 will be connected across the filament circuit of the light source 31 so as to measure the voltage thereacross, this circuit being traceable from one terminal of the indicating terminal 73 by way of a conductor 80, the first contact of the contact set 75 and a conductor 81, to one side of the filament and by way of a conductor 82, the first contact of the contact set 77, a bridging conductor 83, the first contact of the switch set 76 and by way of a conductor 84 to the other side of the indicating meter.

When the multiple position switch 74 is in any one of its last five positions, the vacuum tube voltmeter 72 will be connected to a selected one of the amplifier output circuits and the output circuit of the vacuum tube voltmeter will be connected across the indicating meter 73. Assuming, for example, that the switch 74 is in its second position, a circuit may be traced from the upper one of the amplifiers 67 through its associated rheostat 68, a conductor 85, the second contact of the contact set 77, the conductor 83, the second contact of the contact set 76, and by way of a conductor 86 to the vacuum tube voltmeter 72. The output circuit of the vacuum tube voltmeter extends from one output terminal 87 thereof through a conductor 88, the second contact of the contact set 75, the conductor 80, the indicating meter 73, and by way of a conductor 89 to the other output terminal 90 of the vacuum tube voltmeter.

In addition to the above described electrical elements, components and circuits, the reproducing and translating apparatus includes a motor 91 for driving the rotatable drum 43 and, as diagrammatically shown in Fig. 9, this motor 91 is adapted to be energized from a variable frequency source which may preferably constitute a variable frequency oscillator and amplifier unit 92, which is energized from a suitable source of energy represented by the terminals 93. In accordance with the present invention, all of the electrical components and parts illustrated diagrammatically in Figs. 8 and 9 are compactly disposed within the cabinet 10 in readily accessible and readily adjustable relation, some of the components being mounted beneath the bottom wall 19, as shown in Fig. 2, and the remaining components being disposed in the compartments 25 and 30, as shown best in Figs. 3 and 4. As shown in Fig. 4, the motor 91 is mounted on the bottom wall 19 of the cabinet within the compartment 25, and is provided with a suitable shaft which extends through the bottom wall and carries a drive pulley 95 (Fig. 2) adapted to be connected by a suitable belt 96 to the drive pulley 51 of the rotatable drum 43. If desired, tension means comprising a floating pulley 97 and a spring 98 may be provided, arranged as shown in Fig. 2, for maintaining the belt 96 taut about the pulleys 51 and 95.

In order to provide the desired compact and readily accessible arrangement, the various components and parts which make up the above described electrical circuits are divided into subassemblies and mounted on horizontally extending panels 99 and 100 carried by the removable front wall portion 17. In Fig. 3 the removable front wall portion 17 is shown in its normal position with the supporting panels 99 and 100 respectively extending into the compartments 25 and 30, the panel 99 being disposed above the motor 91 and each panel carrying various electrical component parts on both the upper and lower surfaces thereof. In Fig. 4 the removable front portion 17 is shown in disassembled relation and reversed so as to expose to view the under side of the panels 99 and 100 and the various components carried thereby.

Although the various components and parts may be arranged as desired, in the particular embodiment shown the rheostat 79 for controlling the energization of the lamp 31 is preferably mounted on the front wall portion 17 above the supporting panel 100, and is connected to a suitable control knob 101 carried by the front wall portion 17. Similarly the multiple position switch 74 is preferably mounted beneath the horizontal panel 100 (Fig. 4) and is connected to a suitable control knob 102 carried by the wall portion 17, the control knob being provided with a first position indicated by the letter "L" to which the switch 74 may be adjusted when it is desired to monitor the light source 31, and with five other positions numbered 1 to 5, inclusive, which are employed for individually monitoring the various amplifier circuits. The indicating meter 73 is preferably located as shown in Figs. 3 and 4 on the fixed portion 16 of the front wall, and a plurality of control knobs 103 are provided, one of which is associated with each of the attenuators 69, the attenuators preferably being arranged to adjust the output voltages supplied to the output terminal board in a predetermined number of uniform steps from minimum to maximum voltage.

Also mounted on the portion 16 of the front wall of the cabinet is a control knob 104 which is arranged, as hereinafter explained, to control the speed of the driving motor 91 between minimum and maximum speeds. In addition, the movable portion 17 of the front wall is provided with a control knob 105, which may be employed to control the synchronizing facilities described below and, as shown in Fig. 1, the removable wall portion 17 is preferably provided with a viewing panel 106, which is connected by a suitable hinge 107 and which permits inspection of the film or record 45 on the transparent drum 43. Immediately above the control knob 105 on the front wall portion 16 of the cabinet there is mounted an indicating lamp 108 which when energized indicates that the synchronizing facilities are in operation.

Referring now more particularly to Fig. 9 of the drawings, the oscillator and amplifier unit 92 for energizing the film driving motor 91 with variable frequency current is in part illustrated as comprising a resistance-capacitance oscillator section which includes a thermionic tube 109 of the dual diode type. The output frequency of the unit 92 is determined in accordance with conventional practice by means of parallel connected resistance and capacitance elements included in the input circuit of the first section of the tube 109 and resistance and capacitance elements included in the coupling path between the output electrodes of the second tube section and the input electrodes of the first tube section. More specifically, adjustable potentiometers 111 and 112 (indicated structurally at 94 in Fig. 2 of the drawings) are provided in the described circuits to determine the output frequency of the unit 92. The adjustable wipers 110a and 111a of these potentiometers are arranged for operation in response to manual manipulation of the control knob 104 to effect variations in the output frequency of the unit 92.

In order to drive the motor 91 at a synchronous speed determined by the frequency of a standard sixty cycle power source 114, facilities are provided for locking the output frequency of the oscillator section of the unit 92 in step with a voltage derived from the sixty cycle source 114. These facilities comprise the previously described switch 105 which is of the four-pole single throw type and a full wave rectifier 113.

For the purpose of making a short synchronous speed check to determine whether or not the drum 43 is being driven at the synchronous speed determined by the frequency of the source 114, a stroboscopic light source in the form of a neon tube 115 is provided. This tube is arranged for excitation from the source 114 through the contacts of an on-off switch 116 and a wave shaping circuit comprising a series resistor 118 and a shunt capacitor 119. These two circuit elements perform the function of sharpening the voltage impulse delivered to the tube 115 from the source 114 when the switch 116 is closed. As best shown in Fig. 4 of the drawings, the neon tube 115 is disposed in the front left corner of the compartment 28 adjacent the base of the drum 43. This drum has inscribed around the lower margin thereof equi-spaced synchronizing lines 43a which are spaced a distance equal to the increment of peripheral travel of the drum during the spacing period between flashes of the lamp 115 when this lamp is excited from a sixty cycle current source 114.

From the immediately preceding explanation, it will be understood that in order to make a speed check on the rotational speed of the drum 43, the two switches 105 and 116 are closed. In addition, the speed control knob 104 is adjusted to change the output frequency of the unit 92 to approximately the value required to drive the motor 91 at the synchronous speed corresponding to the sixty cycle frequency of the current source 114. With the switch 116 closed, the lamp 115 is periodically ionized to produce extremely short light flashes which illuminate the base of the drum 43. Thus the lamp 115 acts as a stroboscopic light source. With the switch 105 closed, sixty cycle energy from the source 114 is applied to the rectifier 113 through a transformer 117, and direct current carrying a 120 cycle ripple component is impressed across the terminals of the indicating lamp 108 in parallel with a resistor 112 included in the cathode leg of the oscillator tube 109. The current delivered to the lamp 108 is effective to illuminate this lamp and thus indicate that the synchronizing facilities are in operation. The 120 cycle ripple component of the voltage developed across the output terminals of the rectifier 113 and impressed across the resistor 112 is effective to pull the output frequency of the oscillator section 109 of the unit 92 into step therewith. Accordingly, the motor 91 rotates at a speed which is locked in synchronism with the alternating voltage of the source 114. If the apparatus and particularly the unit 92 is operating properly, the lines 43a on the drum 43 are moved in synchronism with the flashes developed by the lamps 115 with the result that a single line is effectively viewed by the operator. On the other hand, if the oscillator and amplifier unit 92 is not delivering an output voltage which is synchronized with the frequency of the source 114, the lines 43a will of course "drift" in one direction or the other to provide an indication that the drum is being driven at an improper speed. Thus the described facilities afford an arrangement whereby the speed of operation of the drum 43 may be checked from a standard commercial current source of fixed and regulated frequency.

While a particular embodiment of the invention has been shown, it will be understood, of course, that the invention is not limited thereto since many modifications may be made and it is therefore contemplated by the appended claims to cover any such modifications as fall within the true spirit and scope of the invention.

What is claimed and desired to be secured by Letters Patent is:

1. In a reproducing apparatus of the type including a light source, a record-supporting rotatable transparent drum, photoelectric cell means including a plurality of photoelectric cells supportable within said drum, and output circuit means comprising individual electric signal amplifying means energizable respectively from said cells, the combination of a cabinet enclosing said apparatus and including a wall forming a control panel, monitoring means in said cabinet including an indicating element on said panel, switch means on said panel for selectively associating said monitoring means with said individual amplifying means and with said light source, a plurality of attenuator means in said output circuit means for individually controlling the output signal level of said amplifying means, and means on said control panel for individually adjusting said attenuator means.

2. In a reproducing apparatus of the type including a light source, a record-supporting rotatable transparent drum, photoelectric cell means including a plurality of photoelectric cells supportable within said drum, and output circuit means comprising individual electric signal amplifying means energizable respectively from said cells, the combination of a cabinet enclosing said apparatus and including a front wall forming a control panel and having a removeable portion, horizontal panel means extending rearwardly from said removeable wall portion for supporting components of said amplifying means within said cabinet in readily accessible relation, monitoring means in said cabinet including an indicating element on said control panel, switch means on said removeable portion for selectively associating said monitoring means with said individual amplifying means, a plurality of attenuator means in the output circuits of said individual amplifying means, and means on said control panel for individually adjusting said attenuator means to control the respective output signal levels of said amplifying means.

3. In a reproducing apparatus of the type including a light source, a record-supporting rotatable transparent drum, photoelectric cell means including a plurality of photoelectric cells supportable within said drum, and output circuit means comprising individual electric signal amplifying means energizable respectively from said cells, the combination of a cabinet enclosing said apparatus and including a front wall forming a control panel and having a removeable portion, horizontal panel means extending rearwardly from said removeable wall portion for supporting components of said amplifying means within said cabinet in readily accessible relation, monitoring means in said cabinet including an indicating element on said control panel, means including a control member mounted on said control panel for varying the energization of said light source, switch means on said control panel for selectively associating said monitoring means with said individual amplifying means or with said light source, and attenuator means including a plurality of control members on said panel for adjusting the individual output signal levels of said amplifying means.

4. In a reproducing apparatus of the type including a light source, a record-supporting rotatable transparent drum, photoelectric cell means including a plurality of photoelectric cells supportable within said drum, and output circuit means comprising individual electric signal amplifying means energizable respectively from said cells, the combination of a cabinet enclosing said apparatus, partition means in said cabinet defining a substantially L-shaped light path having a light transmitting aperture in the inner wall of one leg of said path, means mounting said drum in said cabinet opposite said aperture, said cabinet including a front wall forming a control panel having an inspection panel adjacent said drum, monitoring means in said cabinet including an indicating element on said panel, switch means on said panel for selectively associating said monitoring means with said individual amplifying means, and means for supporting component parts of said amplifying and monitoring means in said cabinet outside of said light path and in readily removeable relation.

5. In a reproducing apparatus of the type including a light source, a record-supporting rotatable transparent drum, photoelectric cell means supportable within said drum, and output circuit means comprising electric signal amplifying means energizable from said photoelectric cells; the combination of a cabinet having fixed back, bottom and end walls and having removeable top and front walls; partition means in said cabinet cooperating with said walls to provide a first circuit-component compartment adjacent one end of said cabinet, an L-shaped light path having one leg extending parallel to said compartment, an L-shaped drum-and-record chamber nested within said light path, and a second circuit-component compartment nested within said L-shaped chamber; said partition means providing a light transmitting aperture between one leg of said light path and the corresponding leg of said drum-and-record chamber; means in said light path for directing a beam of light from said light source at one end of said path along the legs thereof and through said aperture and said record supporting drum to said photoelectric cell means; a pair of horizontally disposed panels carried by said front wall and respectively extending into said circuit-component compartments for removeably supporting therein components of said output circuit means; and a panel removeably supported over said drum-and-record compartment for suspending said photoelectric cell means within said drum for ready removal therefrom when said top wall is removed.

6. In a reproducing apparatus of the type including a light source, a record-supporting rotatable transparent drum, photoelectric cell means supportable within said drum, and output circuit means comprising electric signal amplifying means energizable from said photoelectric cells; the combination of a cabinet having fixed back, bottom and end walls and having removeable top and front walls; partition means in said cabinet cooperating with said walls to provide a first circuit-component compartment adjacent one end of said cabinet, an L-shaped light path having one leg extending parallel to said compartment, an L-shaped drum-and-record chamber nested within said light path, and a second circuit-component compartment nested within said L-shaped chamber; said partition means providing a light transmitting aperture between one leg of said light path and the corresponding leg of said drum-and-record chamber; means in said light path for directing a beam of light from said light source at one end of said path along the legs thereof and through said aperture and said record supporting drum to said photoelectric cell means; monitoring means in said cabinet including an indicating element, switch means for selectively associating said monitoring means with the amplifying means of said photoelectric cells, and a pair of horizontally disposed panels carried by said front wall and respectively extending into said circuit-component compartments for removeably supporting therein components of said amplifying and monitoring means.

7. In a reproducing apparatus of the type including a light source, a record-supporting rotatable transparent drum, photoelectric cell means supportable within said drum, and output circuit means comprising electric signal amplifying means energizable from said photoelectric cells; the combination of a cabinet; partition means in said cabinet cooperating with the outer walls thereof to provide a first compartment adjacent one end of said cabinet, an L-shaped light path having one leg extending parallel to said compartment, and L-shaped drum-and-record chamber in nested relation to said light path, and a second compartment in nested relation to said L-shaped chamber; said partition means providing a light transmitting aperture between parallel legs of said light path and chamber; means rotatably mounting said drum in one leg of said chamber opposite said aperture; means in said light path for directing a beam of light from said light source at one end of said path along the legs thereof and through said aperture and said record supporting drum to said photoelectric cell means; the front wall of said cabinet including a removeable portion; and means supported on said moveable portion extending into said first and second compartments for removeably supporting therein components of said output circuit means.

8. In a reproducing apparatus of the type including a light source, a record-supporting rotatable transparent drum, photoelectric cell means supportable within said drum, and output circuit means comprising electric signal amplifying means energizable from said photoelectric cells; the combination of a cabinet; partition means in said cabinet cooperating with the outer walls thereof to provide a first compartment adjacent one end of said cabinet, an L-shaped light path having one leg extending parallel to said compartment, an L-shaped drum-and-record chamber in nested relation to said light path, and a second compartment in nested relation to said L-shaped chamber; said partition means providing a light transmitting aperture between parallel legs of said light path and chamber; means including a shaft extending through the bottom wall of said cabinet for rotatably mounting said drum in one leg of said chamber opposite said aperture; roller means adjustably mounted in the other leg of said chamber for guiding in L-shaped paths endless records of various lengths supported on said drum; motor means in said first compartment including a drive shaft extending through said bottom wall; means disposed beneath said bottom wall for connecting said shafts in driving relation; means in said light path for directing a beam of light from said source at one end of said path along the legs thereof and through said aperture and said record supporting drum to said photoelectric cell means; the front wall of said cabinet including a removeable portion, and means supported on said portion extending into said first and second compartments for removeably supporting above said motor in said first compartment and in said suspended relation in said second compartment components of said output circuit means.

9. Apparatus for translating into electrical signal energy the information contained on partially transparent records, comprising a housing, partition means in said housing defining a substantially L-shaped light path having a light transmitting aperture in the inner wall of one leg of said path, a record-supporting drum formed of light-transmitting material rotatably mounted opposite said light transmitting aperture exterior to said light path but within the confines of said L, a fixed light source mounted adjacent the end of the other leg of said light path, means in said light path for directing a beam of light from said source along said legs of said path and through said aperture to said record-supporting drum, means for rotating said drum, and means including a photoelectric cell removeably mounted within said drum for converting said beam of light as caused to vary by a record on said drum into varying electrical energy.

10. Apparatus for translating into electrical signal energy the information contained on partially transparent records, comprising a housing, partition means in said housing defining a substantially L-shaped light path having a light transmitting aperture in the inner wall of one leg of said path, a record-supporting drum formed of light-transmitting material rotatably mounted opposite said light transmitting aperture exterior to said light path but within the confines of said L, a fixed light source mounted adjacent the end of the other leg of said light path, means in said light path for directing a beam of light from said source along said legs of said path and through said aperture to said record-supporting drum, means for rotating said drum about a vertical axis, a panel removeably supported above said drum, and a photoelectric cell assembly mounted on said panel, and including a photoelectric cell suspended within said drum for converting said beam of light as caused to vary by a record on said drum into varying electrical energy.

11. Apparatus for translating into electrical signal energy the information contained on partially transparent records, comprising a housing, partition means in said housing defining a substantially L-shaped light path having a light transmitting aperture in the inner wall of one leg of said path, a record-supporting drum formed of light-transmitting material rotatably mounted opposite said light transmitting aperture exterior to said light path but within the confines of said L, a fixed light source mounted adjacent the end of the other leg of said light path, means in said light path for directing a beam of light from said source along said legs of said path and through said aperture to said record-supporting drum, other partition means in said housing cooperating with said first mentioned partition means to form an L-shaped chamber nested within said L-shaped light path, a record supporting drum formed of light transmitting material mounted in one leg of said chamber opposite said aperture for rotation about a vertical axis, roller means adjustably mounted in the other leg of said L-shaped chamber and cooperating with said drum to support thereon endless records of variable length, a fixed light source mounted adjacent the end of the other leg of said L-shaped light path, means in said light path for directing a beam of light from said source along said legs of said path and through said aperture to said record supporting drum, a panel removeably supported above said one leg of said chamber, and a photoelectric cell assembly carried by said panel and including a photoelectric cell suspended within said drum in the path of said light beam.

ROBERT W. BALTOSSER.

No references cited.